United States Patent [19]

Semel et al.

[11] Patent Number: 5,755,980
[45] Date of Patent: May 26, 1998

[54] PROCESS FOR ELIMINATING ADSORBABLE ORGANIC HALOGEN COMPOUNDS FROM WASTEWATER

[75] Inventors: Joachim Semel, Eppstein; Heribert Tetzlaff, Dietzenbach, both of Germany

[73] Assignee: Hoechst Aktiengesellschaft, Frankfurt, Germany

[21] Appl. No.: 712,428

[22] Filed: Sep. 11, 1996

[30] Foreign Application Priority Data

Sep. 13, 1995 [DE] Germany ............. 195 33 889.8

[51] Int. Cl.$^6$ ................................... B01D 11/04
[52] U.S. Cl. ............. 210/638; 210/634; 210/639; 210/757
[58] Field of Search ................... 210/634, 638, 210/639, 757, 758, 909

[56] References Cited

U.S. PATENT DOCUMENTS

| | | | |
|---|---|---|---|
| 4,215,994 | 8/1980 | Kodras | 210/634 |
| 4,340,471 | 7/1982 | Jordan | 210/101 |
| 4,416,767 | 11/1983 | Jordan | 210/634 |
| 4,758,346 | 7/1988 | Johnson | 210/638 |
| 4,842,715 | 6/1989 | Paspek | 210/638 |
| 5,558,775 | 9/1996 | Busch | 210/638 |

FOREIGN PATENT DOCUMENTS

| | | | |
|---|---|---|---|
| 0100765 | 2/1984 | European Pat. Off. | 210/634 |
| 0457359 | 11/1991 | European Pat. Off. | 210/634 |

OTHER PUBLICATIONS

Derwent Abstract No. 8202169. Sep. 25, 1993.

*Primary Examiner*—Ernest G. Therkorn
*Attorney, Agent, or Firm*—Frommer Lawrence & Haug LLP

[57] ABSTRACT

The invention relates to a process for eliminating adsorbable organic halogen compounds from an aqueous phase, in particular from wastewater or from a process solution, in which the aqueous phase is treated with a nonaqueous extraction medium in a liquid-liquid extraction, which comprises, after the extraction, subjecting the adsorbable organic halogen compounds in the extraction medium to a Wurtz-Fittig reaction. Only small amounts of noncritical products such as NaOH and Hcl, which can be readily removed, are formed in the nonaqueous extraction medium. By means of this process, the cost of the chemicals which conventionally arises in the elimination of the adsorbable organic halogen compounds is considerably decreased.

16 Claims, No Drawings

PROCESS FOR ELIMINATING ADSORBABLE ORGANIC HALOGEN COMPOUNDS FROM WASTEWATER

RELATED APPLICATIONS

This application claims priority to German Application No. 19533889.8, filed Sep. 13, 1995, incorporated herein by reference.

BACKGROUND OF THE INVENTION

1. Field of the Invention

The invention relates to a process for eliminating adsorbable organic halogen compounds from an aqueous phase, in particular from wastewater or from a process solution, in which the wastewater or the process solution is treated with a nonaqueous extraction medium in a liquid-liquid extraction.

2. Description of the Related Art

Processes of the said type have been disclosed, for example by DE 34 15 464. In this publication, a process for eliminating adsorbable organic halogen compounds (AOX) from wastewater by liquid-liquid extraction is described, in which a temporarily stable dispersion in the aqueous phase is first prepared from the extraction medium with addition of a soluble sorption-favoring medium, then this dispersion is fed to the wastewater, and after the extraction the dispersed extraction medium is removed from the wastewater by means of a separate separation step. The extraction medium which has been removed, and is laden with the AOX, must then be either directly disposed of (incinerated) or freed from the AOX, for example by distillation. Incineration is a costly process, and in the treatment by distillation, the question again arises of disposal of the AOX-enriched distillation bottom phase. Moreover, the addition of the sorption-favoring medium requires further expenditure in terms of apparatus and engineering.

OBJECT OF THE INVENTION

It is an object of the present invention to improve a process of the type mentioned at the outset in such a manner that the expenditure in terms of apparatus and engineering is reduced and the disposal or treatment of the AOX-laden extraction medium is simplified.

SUMMARY OF THE INVENTION

In this context it is known that halogen-containing organic molecules (for example chlorine-containing molecules) can be decomposed in an inert solvent in the manner of the known Wurtz-Fittig reaction:

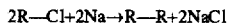

2R—Cl+2Na→R—R+2NaCl

The organic molecules react with liquid dispersed sodium to form dimers and sodium chloride. The reaction was successfully used by Degussa AG, Germany, in order to destroy AOX and dioxins in leachate oil from landfills (DE-A 28 13 200).

The reaction is also known to be used for the dehalogenation of PCBs in transformer oils—as described in DE-A 42 06 308.

Furthermore, the reaction is used in the destruction of PCBs or dioxin in solids, by, after elution of the solids with an inert elution medium, the decomposition of the AOX substances occurring in the elution medium according to the above reaction as described in DE-A 42 03 665.

In all these uses, water is carefully excluded, in order to avoid decomposition reactions of the sodium. It is all the more surprising, that this technology can be used without problem to destroy AOX in wastewater extracts or extracts from aqueous process solutions, which always contain a certain amount of water. The principle in this case is to use extraction media which are as nonpolar as possible and take up little water, in order not only to avoid undesired decomposition of the finely dispersed sodium used for the Wurtz-Fittig reaction, but also to keep the operationally undesired loss of sodium due to the reaction with water in the extraction medium (to give NaOH) as small as possible.

The object was therefore achieved according to the invention with a process of the specified type, which comprises, after the extraction, subjecting the AOX to a Wurtz-Fittig reaction in the extraction medium.

DETAILED DESCRIPTION OF THE INVENTION

The present invention provides a process for eliminating AOX from an aqueous phase, in particular a wastewater or a process solution, in which the wastewater or the process solution is treated with a nonaqueous extraction medium in a liquid-liquid extraction, which comprises, after the extraction, subjecting the AOX in the extraction medium to a Wurtz-Fittig reaction.

In a preferred embodiment, extraction is used and is carried out in a plurality of stages. The extraction, a countercurrent medium, is generally nonpolar and does not react with sodium. Among the suitable extraction media are aromatic, aliphatic compounds and ethers such as toluene, paraffin or di-n-butyl ether. The extraction medium is circulated and the treated aqueous phase is then passed to the biological stage of a sewage treatment plant. The ratio for aqueous phase to extraction medium is between 1:100 and 100:1, preferably between 1:10 and 10:1. The reaction between the extracted adsorbable organic halogen compounds with sodium is carried out at temperatures between the melting point of the sodium and the boiling point of the solvent, preferably between 100° C. and 250° C. The sodium used in excess and the salts formed after the Wurtz-Fittig reaction are removed from the extraction medium by filtering or by back-extraction with water.

Individual or a plurality of the individual features described in the embodiments can also each per se represent solutions according to the invention, and the individual features can also be combined according to choice.

The demands on the AOX content which may still be present in wastewaters after the biological clarification stage are, at 1 mg of AOX/l, very strict in the European Union. The liquid-liquid extraction (LLE) can make a decisive contribution towards complying with this requirement, in particular, if it is linked according to the invention with the destruction of the AOX-causing substance in the organic phase. The great advantage of this novel process is that it targets the AOX alone, whereas current methods for AOX elimination in wastewater also eliminate, together with the AOX, all other substances which make up the chemical oxygen demand (COD) of a wastewater, which has a fundamental disadvantage: the COD of a typical wastewater is about ten times higher than the AOX, since the halogen atom which gives rise to the AOX is only one of many atoms in an organic compound in the wastewater. However, in the analytical determination of the COD value, all atoms of an organic molecule make a contribution, whereas in the AOX, only the halogen atom contributes. Therefore, the demand for chemicals and the corresponding wastewater clean-up costs are much higher in the case of the elimination of the AOX together with the COD than in the case of elimination of the AOX alone. If it is assumed, to a first approximation, that all said methods require, for their implementation, apparatuses, labor and energy whose costs are comparable, the selective elimination of AOX gives considerable economic advantages owing to the costs of chemicals.

Some examples of the clean-up of a typical wastewater containing 20 g/l of COD and 2 g/l of AOX by classical methods (activated carbon adsorption, ozone oxidation) are given in Table 1. For comparison, the process of the invention is also tabulated.

TABLE 1

Typical costs of chemicals for AOX elimination from wastewater by eliminating the COD, compared with eliminating the AOX alone

| Process | | Ozone oxidation | Carbon adsorption | According to the invention |
|---|---|---|---|---|
| COD content | [g/l] | 20 | 20 | 20 |
| AOX content | [g/l] | 2 | 2 | 2 |
| Chemical agent | | ozone | activated carbon | sodium |
| Cost | [DM/kg] | 5.00 | 4.00 | 6.50 |
| Consumption for COD | [kg/kg] | 2.00 | 2.50 | — |
| Consumption for AOX | [kg/kg] | 20.00 | 25.00 | 0.66 |
| Cost of COD elimination | [DM/kg] | 10.00 | 10.00 | — |
| Cost of AOX elimination | [DM/kg] | 100.00 | 100.00 | 4.29 |
| Cost of AOX elimination | [DM/m³] | 200.00 | 200.00 | 8.58 |

Thus, for example, in the case of activated carbon adsorption, at least 2.5 kg of activated carbon are required in order to remove 1 kg of COD from the wastewater, if the maximum capacity of current activated carbons of about 40% can be utilized. Together with this COD, a certain proportion of AOX is removed from the wastewater - in our Example 10%. In order to clean 1 m³ of our example wastewater containing 2 g of AOX/l, activated carbon costing 200.00 DM must be used, 90% of this total being required for the conjoint elimination of the COD. The same applies to wastewater clean-up using ozone (see Table 1).

The costs of chemicals decrease, according to Table 1, when the process of the invention is used, from the previously calculated 200.00 DM/m³ to 8.60 DM/m³.

A further advantage of the presently disclosed process is that the classical AOX-elimination method by simple liquid-liquid extraction is associated with the production of a large amount of secondary problems/secondary waste. The organic phase, after the extraction, must either be fed in entirety to the incineration or distillation or back-extraction is necessary, which, although it makes the extraction medium recyclable, creates a back-extract or distillation residue which must be further processed or incinerated. In the case of the combination claimed here of liquid-liquid extraction and Wurtz-Fittig reaction, only small amounts of the harmless products NaOH and NaCl are formed in the organic phase, which, before their reuse, can be removed by simple filtration or a water wash. The dimers likewise formed in the extraction medium are generally relatively large, nonpolar and therefore water-insoluble organic molecules which slowly accumulate in the organic phase from cycle to cycle. In the case of the amounts of AOX to be extracted, these are (see above) generally small amounts (ppm range), so that it takes a long time until a corresponding amount of dimer has accumulated in the extraction medium. If the dimers do not hinder the extraction, the extraction medium can continue to be recirculated, otherwise it must occasionally be treated by distillation and the residue incinerated. The same applies to other halogen-free compounds which conjointly make up the COD.

To destroy any excess sodium (the amount of sodium corresponding to 105% of the stoichiometric amount of AOX should be sufficient), back-extraction is the most expedient method, because the sodium is then equally decomposed together with the water, whereas in the case of filtration, undesired accumulation of sodium residues in the filter residue can occur, which can then be reacted with isopropanol.

In a preferred embodiment, the extraction can first be performed by a conventional method, continuously in counter-current in a multistage extractor, any suitable extraction apparatus (mixer-settler, column, centrifugal extractor, Graesser contacter, hollow-fiber extraction module) can be used.

The ratio extraction medium/process water can be between 1:100 and 100:1, particularly when a hollow-fiber extraction module is used. However, it is generally between 1:10 and 10:1.

As extraction medium, use can be made of any organic solvents, with the sole proviso that these take up little water, do not react with sodium and have an extraction action with respect to the AOX to be extracted. Those which are suitable are aromatics, aliphatics or ethers, preferably toluene, paraffin or di-n-butyl ether. The wastewater which has been extracted and thus freed from AOX can be passed to the biological stage of a sewage treatment plant.

The extract is preheated in a heat exchanger in counter-current to the already treated extract and finally, in a further heat exchanger, is brought by heating (e.g. with steam or thermal oil) to a reaction temperature which, depending on the boiling point of the extraction medium used, is between 100° C. and 250° C. Lower temperatures require an excessive reaction time.

In a downstream reaction apparatus (kettle or tubular reactor), the amount of finely dispersed sodium calculated in advance from the known AOX of the extract is added, where it reacts immediately. The sodium can either be dispersed itself in the reaction vessel or the sodium dispersion can be prepared in advance in an extra vessel. As a dispersion apparatus for the liquid sodium, a high-speed emulsifier, for example, an Ultra-Turrax, from IKA-Maschinenbau, D-79219 Staufen, can be used. In practical operation, it is most expedient to obtain the sodium from the manufacturer already in liquid form, for example in a heater tanker truck (melting point Na: 97.8° C.) and to add it in liquid form to the vessel used for the reaction. For safety reasons (avoidance of sodium-initiated solvent fires), the reaction should be carried out under nitrogen blanketing.

After the reaction is completed, the procedure can be continued in two ways. Either the salt formed is filtered out of the extraction medium, which is returned to the extraction medium storage vessel via the above-mentioned heat exchanger, or, after the heat exchange, a back-extraction (with water) of the salts (NaOH, NaCl) formed in the Wurtz-Fittig reaction is carried out in an extraction apparatus of choice (see above), the corresponding water phase likewise being passed to the biological sewage treatment stage and the extraction medium being fed to the storage vessel. The decomposition of the slight sodium excess with the back-extract water does not represent a hazard in this case, because the sodium is transferred slowly from the solvent matrix into the water phase, so that no high Na concentrations form locally which could lead to ignition of the water-solvent mixture. However, because of the small amount of hydrogen formed in the reaction of the residual sodium with the back-extract water, it is advisable to operate this plant section under nitrogen blanketing or nitrogen flushing also.

The invention will now be described further with reference to the following examples:

EXAMPLES

Example 1

A wastewater from a pyrazolone production contained 34 mg of AOX/l, which is only 68% biodegradable. It was extracted in seven stages in counter-current in a mixer-settler. The extraction medium used was toluene in a ratio of 1:1. 92% of the AOX were transferred in the course of this from the water to the extraction medium phase (toluene). The remaining wastewater, after biological decomposition, complied with the demand for <1 mg of AOX/l.

The extraction medium phase was then heated under nitrogen to 120° C. and 105% of the theoretical amount of liquid sodium was dispersed therein with the emulsifier. Of the initial 155 ppm of chlorine, <10 ppm were still present after 30 minutes. The NaCl and NaOH formed were filtered off. The water content of the toluene phase only decreased during the treatment from 0.076 to 0.055%, which showed that the reaction of the sodium took place preferentially with the AOX and not with water.

Example 2

A wastewater as in Example 1 was extracted in seven stages in counter-current in a mixer-settler. The extraction medium used was paraffin ($C_{12}$–$C_{18}$ cut) in a ratio of 1:1. 95.8% of the AOX was transferred in the course of this from the wastewater to the extraction medium phase (paraffin). The remaining wastewater, after biological degradation, complied with the demand for <1 mg of AOX/l.

The extraction medium phase was then heated under nitrogen to 200° C., and 105% of the theoretical amount of liquid sodium was dispersed therein with the emulsifier. Of the initial 165 ppm of chlorine, <10 ppm were still present after 10 minutes. The NaCl and NaOH formed were filtered off. The water content of the paraffin phase only decreased during the treatment from 0.23 to 0.11%.

Example 3

A wastewater from a production of 2,4-dichloro-5-sulfamidobenzoic acid contained 4100 mg of AOX/l, which is virtually non-biodegradable. It was extracted in five stages in counter-current in the mixer-settler. The extraction medium used was di-n-butyl ether in a ratio of 2:1. 35% of the AOX were transferred in the course of this at pH 5.3 from the wastewater to the extraction medium phase (di-n-butyl ether). Although the remaining wastewater did not comply with the demand for <1 mg of AOXII, the (still optimizable) removal of its AOX portion contributed considerably to decreasing the load on the biological sewage treatment plant.

The extraction medium phase was then heated under nitrogen to 140° C. and 105% of the theoretical amount of liquid sodium was dispersed therein with the emulsifier. Of the initial 430 ppm of chlorine, <5 ppm were still present after 30 minutes. The NaCl and NaOH formed were filtered off. The water content of the di-n-butyl ether phase decreased during the treatment from only 0.165 to below the detection limit (<0.01%).

We claim:

1. A process for eliminating adsorbable organic halogen compounds from an aqueous phase, in which the aqueous phase is treated with a nonaqueous extraction medium in a liquid-liquid extraction, which comprises, after the extraction, subjecting the adsorbable organic halogen compounds in the extraction medium to a Wurtz-Fittig reaction.

2. The process as claimed in claim 1, wherein the extraction is a counter-current extraction and is carried out in a plurality of stages.

3. The process as claimed in claim 1, wherein the extraction medium is nonpolar and does not react with sodium.

4. The process as claimed in claim 1, wherein the ratio aqueous phase/extraction medium is between 1:100 and 100:1.

5. The process as claimed in claim 1, wherein the extraction medium is stable with respect to sodium at elevated temperature, and wherein the extraction medium is selected from the group consisting of aromatics, aliphatics and ethers.

6. The process as claimed in claim 5, wherein the extraction medium is stable with respect to sodium at elevated temperature, and wherein the extraction medium is selected from the group consisting of toluene, paraffin or di-n-butyl ether.

7. The process as claimed in claim 1, wherein the reaction of the extracted adsorbable organic halogen compounds with sodium in the extraction medium is carried out at temperatures between the melting point of the sodium and the boiling point of the solvent.

8. The process as claimed in claim 7, wherein the reaction of the extracted adsorbable organic halogen compounds with sodium in the extraction medium is carried out at temperatures between 100° C. and 250° C.

9. The process as claimed in claim 1, wherein, after the Wurtz-Fittig reaction, sodium used in excess and the salts formed are removed from the extraction medium by filtering or by back-extraction with water.

10. The process as claimed in claims 1, wherein the extraction medium is circulated and the treated aqueous phase is then passed to the biological stage of a sewage treatment plant.

11. The process as claimed in claim 1, wherein the aqueous phase is wastewater or process solution.

12. The process as claimed in claim 1, wherein the ratio aqueous phase/extraction medium is between 1:10 and 10:1.

13. A method for eliminating adsorbable organic halogen compounds from an aqueous phase in particular from wastewater or from a process solution, in which the aqueous phase is treated with a nonaqueous extraction medium in a liquid-liquid extraction which comprises utilizing nonpolar extraction medium which is stable with respect to sodium at elevated temperature and reacting the adsorbable organic halogen compounds in the extraction medium with sodium at an elevated temperature.

14. The method as claimed in claim 13 wherein the nonpolar extraction medium is selected from the group consisting of aromatics, aliphatics and ethers.

15. The method as claimed in claim 14, wherein the nonpolar extraction medium is selected from the group consisting of toluene, paraffin or di-n-butyl ether.

16. The process as claimed in claim 13, wherein the aqueous phase is wastewater or process solution.

\* \* \* \* \*